United States Patent
Huang et al.

(10) Patent No.: US 11,606,288 B2
(45) Date of Patent: Mar. 14, 2023

(54) NETWORK COMMUNICATION METHOD AND APPARATUS

(71) Applicant: HUAWEI TECHNOLOGIES CO., LTD., Guangdong (CN)

(72) Inventors: Wei Huang, Dongguan (CN); Yongjian Hu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 122 days.

(21) Appl. No.: 17/113,555

(22) Filed: Dec. 7, 2020

(65) Prior Publication Data

US 2021/0092055 A1   Mar. 25, 2021

Related U.S. Application Data

(63) Continuation of application No. PCT/CN2019/089868, filed on Jun. 3, 2019.

(30) Foreign Application Priority Data

Jun. 8, 2018   (CN) .......................... 201810586061.9

(51) Int. Cl.
*H04L 45/50* (2022.01)
*H04L 12/46* (2006.01)
(Continued)

(52) U.S. Cl.
CPC .......... *H04L 45/50* (2013.01); *H04L 12/4633* (2013.01); *H04L 45/22* (2013.01); *H04L 45/28* (2013.01)

(58) Field of Classification Search
CPC ..... H04L 45/50; H04L 12/4633; H04L 45/22; H04L 45/28; H04L 12/40182;
(Continued)

(56) References Cited

U.S. PATENT DOCUMENTS

2015/0109938 A1* 4/2015 Zhang ................... H04L 43/10
                                                               370/241.1
2017/0064717 A1   3/2017 Filsfils et al.
(Continued)

FOREIGN PATENT DOCUMENTS

CN   101145951 A   3/2008
CN   101719843 A   6/2010
(Continued)

OTHER PUBLICATIONS

ITU-T G.8013/Y.1731, "OAM functions and mechanisms for Ethernetbased networks", Jul. 2011, total 92 pages.
(Continued)

*Primary Examiner* — Donald L Mills
(74) *Attorney, Agent, or Firm* — Womble Bond Dickinson (US) LLP

(57) ABSTRACT

This application provides a communication method and a communications apparatus. The method can include performing extension based on an existing operation, administration, and maintenance (OAM) packet after an intermediate node in a path of a segment routing traffic engineering (SR-TE) tunnel senses a bit error fault, to support a bit error switching function. That is, the method can include adding, to the OAM packet, identification information used to identify that signal degradation occurs in the SR-TE tunnel. As a result, it is ensured that the SR-TE tunnel supports the bit error switching function of the intermediate node, and a customer service can be effectively prevented from being damaged.

14 Claims, 9 Drawing Sheets

(51) Int. Cl.
*H04L 45/00* (2022.01)
*H04L 45/28* (2022.01)

(58) Field of Classification Search
CPC ....... H04L 41/0663; H04L 43/10; H04L 1/22;
H04L 29/06; H04L 41/0631; H04L 69/06
See application file for complete search history.

(56) References Cited

U.S. PATENT DOCUMENTS

| | | | |
|---|---|---|---|
| 2017/0339028 A1* | 11/2017 | Holness | G06F 11/3409 |
| 2018/0041420 A1 | 2/2018 | Saad et al. | |
| 2020/0366613 A1* | 11/2020 | Skalecki | H04L 47/122 |

FOREIGN PATENT DOCUMENTS

| | | |
|---|---|---|
| CN | 104618189 A | 5/2015 |
| CN | 105281931 A | 1/2016 |
| EP | 2645640 A2 | 10/2013 |
| JP | H05252184 A | 9/1993 |
| JP | 2011151752 A | 8/2011 |
| JP | 2013038570 A | 2/2013 |
| JP | 2015159486 A | 9/2015 |
| JP | 2017034463 A | 2/2017 |
| JP | 2017518705 A | 7/2017 |
| KR | 20160109162 A | 9/2016 |
| WO | 2012133635 A1 | 10/2012 |
| WO | 2015192518 A1 | 12/2015 |

OTHER PUBLICATIONS

C. Filsfils, Ed. et al,"Segment Routing Architecture draft-ietf-spring-segment-routing-04", Network Working Group Internet-Draft, Jul. 31, 2015, total 21 pages.

ITU-T Y. 1731,"OAM functions and mechanisms for Ethernetbased networks", May 2006, total 80 pages.

ITU-T G.8132/Y.1383, Series G: Transmission Systems and Media, Digital Systems and Networks; Packet over Transport aspects MPLS over Transport aspects;Series Y: Global Information Infrastructure, Internet Protocol Aspects, Next-Generation Networks, Internet of Things and Smart Cities;MPLS-TP shared ring protection,(Aug. 2017),Total 26 Pages.

ITU-T G.8131/Y.1382 Amendment 2,Series G: Transmission Systems and Media, Digital Systems and Networks;Packet over Transport aspects MPLS over Transport aspects;Series Y: Global Information Infrastructure, Internet Protocol Aspects and Next-Generation Networks, Internet of Things and Smart Cities;Linear protection switching for MPLS transport profile,(Nov. 2016),Total 38 Pages.

Akira Sakurai, Draft revised recommendation ITU-T G.8021/Y. 1341 (for consent), International Telecommunication Union, Telecommunication Standardization Sector Study Period 2017-2020, SG15-TD156/PLEN Study Group 15, Geneva, Jan. 29-Feb. 9, 2018, total 298 pages.

R. Ram et al, SD detection and protection triggering in MPLS-TP draft-rkhd-mpls-tp-sd-03.txt, MPLS Working Group Internet Draft, May 31, 2011, total 9 pages.

Clarence Fils Is et al, The Segment Routing Architecture, 2015 IEEE Global Communications Conference, total 6 pages.

* cited by examiner

| 8 | 7 | 6 | 5 | 4 | 3 | 2 | 1 |
|---|---|---|---|---|---|---|---|
| MSB (most significant bit) | | | | | | | LSB (least significant bit) |
| Remote defect indication (RDI) | SD (signal degradation) | Reserved (reserved) | | | Period (periodicity) | | |

FIG. 3b

| 8 | 7 | 6 | 5 | 4 | 3 | 2 | 1 |
|---|---|---|---|---|---|---|---|
| SD (signal degradation) | Reserved (reserved) | | | | | | Type |

MSB (most significant bit) ... LSB (least significant bit)

FIG. 3c

|   | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
|   | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
|   | Request/state (request/state) | | | | Prot. Type protocol type | | | | Requested Signal requested signal | | | | | | | | Bridged Signal bridged signal | | | | | | | | Reserved (reserved) | | | | | | | |
|   | | | | | | | A | B | D | R | | | | | | | | | | | | | | | | | | | | | | | |

FIG. 4b

NETWORK COMMUNICATION METHOD AND APPARATUS

CROSS-REFERENCE TO RELATED APPLICATIONS

This application is a continuation of International Application No. PCT/CN2019/089868, filed on Jun. 3, 2019, which claims priority to Chinese Patent Application No. 201810586061.9, filed on Jun. 8, 2018. The disclosures of the aforementioned applications are hereby incorporated by reference in their entireties.

TECHNICAL FIELD

This application relates to the field of communications technologies, and in particular, to a network communication method and apparatus.

BACKGROUND

Automatic protection switching (APS) is a protection mechanism in which a communications device at an end sends an APS request by using an APS packet and switches collaboratively with a device at a peer end to a communication channel when finding that a fault occurs in a currently used communication channel.

In a segment routing traffic engineering (SR-TE) tunnel, guidance on path forwarding is provided based on segment routing. When a packet enters a network, a source node adds, to a frame header of the packet, an instruction set (also referred to as a label stack) used to provide guidance on forwarding, and a subsequent node queries a forwarding information table based on an instruction (also referred to as a label), to obtain a next hop and an outbound interface to forward the packet. In a strict explicit path in an SR-TE tunnel mechanism, outermost adjacent segment identification (Adj-SID) is used to forward the packet to a corresponding link port, thereby implementing packet forwarding.

To protect the SR-TE tunnel, during network deployment, APS protection is usually deployed for the SR-TE tunnel. When a fault occurs in a working SR-TE tunnel, the APS is triggered, and service transmission is switched from the working SR-TE tunnel to a protection SR-TE tunnel, to prevent a customer service from being damaged. In an existing APS protection mechanism of the SR-TE tunnel, an operation, administration, and maintenance (OAM) packet is usually used to detect a fault of a service path. However, in some fault scenarios, the fault cannot be detected by using an existing OAM packet. Consequently, the customer service is damaged. For example, when a port bit error fault occurs on an intermediate node in the working SR-TE tunnel, a port on which a bit error fault occurs randomly modifies a received packet. If within an OAM packet transmission interval, the port just does not affect the received OAM packet but modifies data in a service packet, the OAM packet forwarded by the port is still a normal OAM packet, but the data in the service packet forwarded by the port has been modified. However, for a sink node, if the normal OAM packet is received, the sink node considers that a working path is normal, does not trigger APS switching, and continues to receive the service packet by using a current working path. Actually, the service packet has been modified due to the port bit error fault of the intermediate node. In this case, because the service packet is modified, the sink node may fail to normally parse the received service packet, and cannot further process the service packet. Consequently, the customer service cannot be effectively processed, resulting in damage to the customer service.

SUMMARY

In view of this, embodiments of this application provide a network communication method and apparatus, to more accurately specify APS switching of an end-to-end SR-TE tunnel, thereby effectively reducing damage to a normal customer service, and improving service transmission accuracy.

According to a first aspect, this application provides a network communication method. The network comprises a first provider edge PE node and a second PE node. The first PE node is connected to the second PE node by separately using a working segment routing traffic engineering SR-TE tunnel and a protection SR-TE tunnel. A path of the working SR-TE tunnel comprises the first PE node, an intermediate node, and the second PE node. The intermediate node is a node between the first PE node and the second PE node. The method comprises: receiving, by the intermediate node by using the working SR-TE tunnel, a first operation, administration, and maintenance OAM packet sent by the first PE node; determining, by the intermediate node, that a port bit error fault occurs; encapsulating, by the intermediate node, identification information in the first OAM packet, to obtain a second OAM packet, where the identification information is used to identify that signal degradation SD occurs in the working SR-TE tunnel; and sending, by the intermediate node, the second OAM packet to the second PE node by using the working SR-TE tunnel, where the second OAM packet is used to instruct the second PE node to switch to the protection SR-TE tunnel to communicate with the first PE node.

In a possible embodiment, the second OAM packet is a continuity check message (CCM), and the identification information is carried in a Flag field in the CCM message or a Reserved field in the CCM message.

According to the method provided in this application, in a network architecture in which the SR-TE tunnel is deployed, after the intermediate node in the path of the SR-TE tunnel senses a bit error fault, extension is performed based on an existing OAM packet, to support a bit error switching function. The intermediate node encapsulates, in a received OAM packet, identification information that identifies link signal degradation, and sends, to a PE node at a sink end, the packet in which the identification information is encapsulated, so that when receiving the extended OAM packet, the PE node at the sink end can learn, based on the identification information carried in the packet, that signal degradation occurs in a current SR-TE tunnel. According to the method of this application, it is effectively ensured that the SR-TE tunnel supports the intermediate node in bit error switching, and a customer service can be effectively prevented from being damaged.

According to a second aspect, this application provides a network communication method. The network comprises a first provider edge PE node and a second PE node. The first PE node is connected to the second PE node by separately using a working segment routing traffic engineering SR-TE tunnel and a protection SR-TE tunnel. A path of the working SR-TE tunnel comprises the first PE node, an intermediate node, and the second PE node. The method comprises: receiving, by the second PE node by using the working SR-TE tunnel, a first operation, administration, and maintenance OAM packet sent by the intermediate node, where the first OAM packet carries identification information, and the identification information is used to identify that signal degradation SD occurs in the working SR-TE tunnel; determining, by the second PE node based on the identification information, that the SD occurs in the working SR-TE tunnel; and switching, by the second PE node, to the protection SR-TE tunnel to communicate with the first PE node.

In a possible embodiment, the first OAM packet is a continuity check message (CCM), and the identification information is carried in a flag field in the CCM message or a reserved field in the CCM message.

In a possible embodiment, after the switching, by the second PE node, to the protection SR-TE tunnel, the method further comprises:

sending, by the second PE node, an automatic protection switching APS packet to the first PE node by using the protection SR-TE tunnel, where the APS packet is used to instruct the first PE node to switch to the protection SR-TE tunnel to communicate with the second PE node.

In a possible embodiment, before the receiving, by the second PE node, the first OAM packet sent by the intermediate node, the method further comprises: determining, by the intermediate node, that a port bit error fault occurs; receiving, by the intermediate node, a second OAM packet sent by the first PE node; encapsulating, by the intermediate node, the identification information in the second OAM packet, to obtain the first OAM packet; and sending, by the intermediate node, the first OAM packet to the second PE node.

In the foregoing method provided in this application, after receiving the OAM packet sent by the first PE node, the second PE node parses the OAM packet, to obtain the identification information, and may determine, based on the identification information, whether the signal degradation occurs in the working SR-TE tunnel. Compared with prior approaches, APS switching of an end-to-end SR-TE tunnel can be specified more accurately. Specifically, in the prior approaches, for the end-to-end SR-TE tunnel, when the port bit error fault occurs on the intermediate node in the working SR-TE tunnel, packet data that passes through a port of the intermediate node is randomly modified due to the port bit error fault. If the OAM packet is just not modified when passing through the port of the intermediate node, that is, data in the OMA packet is not modified, after receiving the packet, the second PE node parses the packet, and determines, according to a field matching rule, that a normal OAM packet is received. Therefore, the second PE node does not trigger APS protection, and continues to communicate with the first PE node by using working SR-TE tunnel. The OAM packet usually has a relatively long transmission periodicity. For example, the periodicity is 3.3 milliseconds (ms). During the transmission periodicity, the intermediate node receives another service packet, and a normal customer service packet may be modified due to the port bit error fault. However, the second PE node previously receives the normal OAM packet, and considers that no fault occurs in the working SR-TE tunnel. Therefore, the second PE node does not trigger the APS protection, and continues to communicate with the first PE node on the working SR-TE tunnel. However, in this case, the customer service has been damaged due to the port bit error fault of the intermediate node on the link. During a next transmission periodicity, the second PE node triggers the APS protection only when the second PE node cannot receive the OAM packet. Otherwise, the second PE node continues to communicate with the first PE node by using the working SR-TE tunnel. Consequently, the customer service may be continuously damaged. In other words, in the prior approaches, when the port bit error fault of the intermediate node results in signal degradation of a current transmission path, the packet can only be randomly modified due to the port bit error fault. Consequently, a sink node may normally receive the OAM packet, and cannot correctly trigger APS switching. However, according to the method in this application, after determining that the port bit error fault occurs, the intermediate node adds, to the OAM packet, identification information that identifies that the signal degradation occurs in the current transmission path. Therefore, after receiving the OAM packet, although the second PE node parses the packet through normal field matching and fails to find that the signal degradation occurs in the current transmission path, the second PE node can still identify, by using the identification information carried in the packet, that the SD occurs in the current transmission path, so that the APS switching of the end-to-end SR-TE tunnel can be specified more accurately.

According to a third aspect, this application provides a network communications apparatus. The network communications apparatus comprises: a memory, where the memory comprises a computer-readable instruction; and a processor connected to the memory, where the processor is configured to execute the computer-readable instruction, to perform the operation in the method according to the first aspect or any possible design of the first aspect.

According to a fourth aspect, this application provides a network communications apparatus. The network communications apparatus comprises: a memory, where the memory comprises a computer-readable instruction; and a processor connected to the memory, where the processor is configured to execute the computer-readable instruction, to perform the operation in the method according to the second aspect or any possible design of the second aspect.

According to a fifth aspect, this application provides a communications system. The communications system comprises the network communications apparatus provided in the third aspect and the network communications apparatus provided in the fourth aspect.

According to a sixth aspect, an embodiment of this application provides a computer-readable storage medium. The computer-readable storage medium stores an instruction, and when the instruction is run on a computer, the computer is enabled to execute an instruction of the method according to the first aspect, the second aspect, any possible implementation of the first aspect, or any possible implementation of the second aspect.

According to the method provided in this application, in a network architecture in which the SR-TE tunnel is deployed, after an intermediate node in a path of the SR-TE tunnel senses a bit error fault, extension is performed based on the existing OAM packet, to support a bit error switching function. It is effectively ensured that the SR-TE tunnel supports the intermediate node in bit error switching, and the customer service can be effectively prevented from being damaged. In addition, in the method of this application, interconnection between devices of different vendors is supported. In a scenario in which a device does not support the bit error switching, a received packet is not modified, and a normal function of the SR-TE tunnel is not affected.

BRIEF DESCRIPTION OF DRAWINGS

FIG. 3b is a schematic diagram of a format of a Flag field in an extended CCM PDU;

FIG. 3c is a schematic diagram of a format of a Flag field in an extended DMM PDU;

FIG. 4b is a schematic diagram of a format of an APS data field.

DESCRIPTION OF EMBODIMENTS

Figure 1:
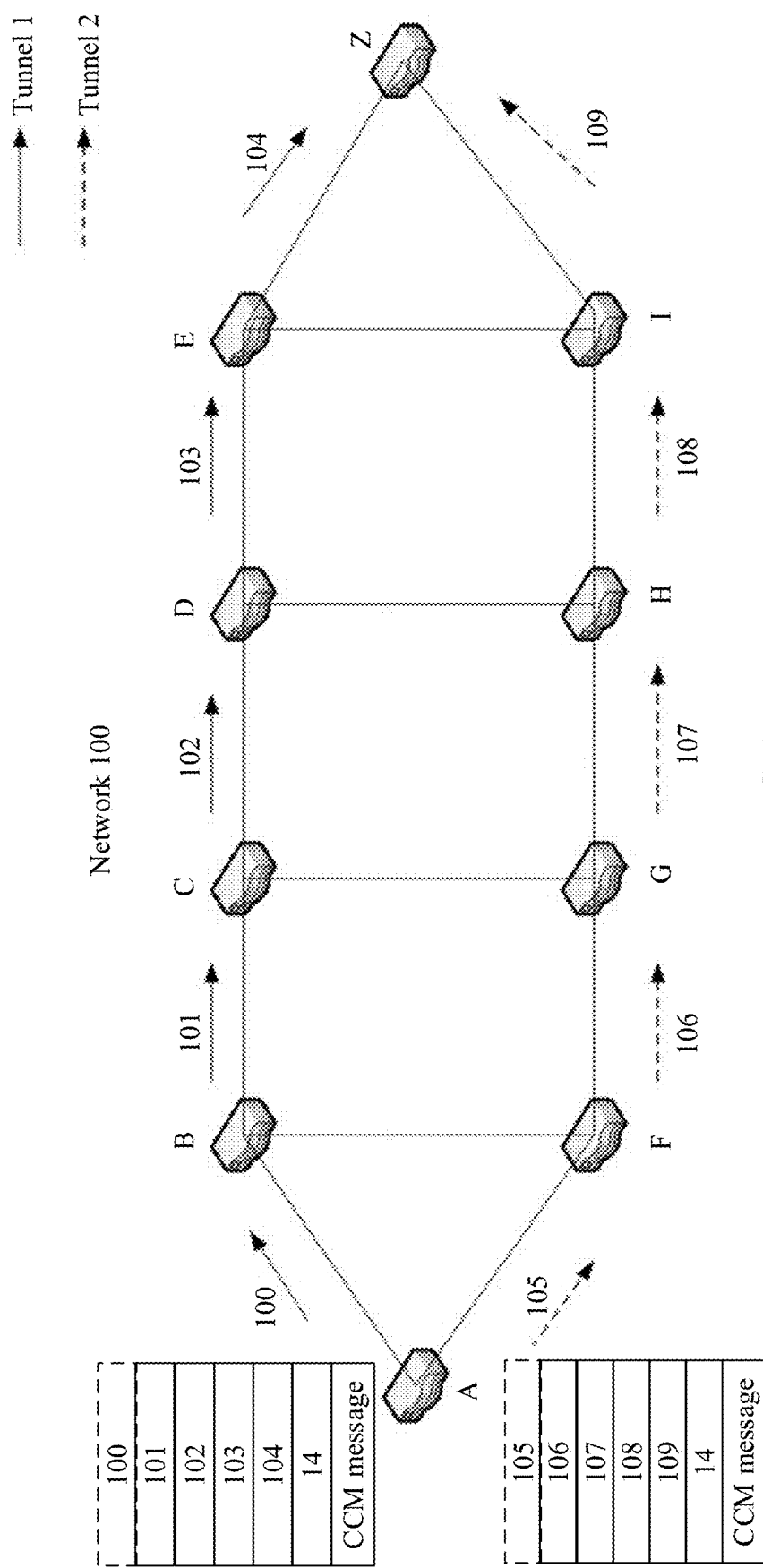
FIG. 1 is a schematic diagram of a system architecture of a network to which an embodiment of this application is applied.

Application scenarios described in embodiments of the present invention are intended to describe technical solutions in the embodiments of the present invention more clearly, and do not constitute a limitation on the technical solutions provided in the embodiments of the present invention. A person of ordinary skill in the art may know that: With the evolution of a network architecture and the emergence of new service scenarios, the technical solutions provided in the embodiments of the present invention are also applicable to similar technical problems.

Unless otherwise described oppositely, ordinal numbers such as "1", "2", "first", and "second" mentioned in this application are used to differentiate a plurality of objects, and are not used to limit an order of the plurality of objects.

A node in this application may be a router, a packet transport network device, a switch, a fire wall, or the like. For ease of description, in this application, the devices mentioned above are collectively referred to as nodes.

A working channel described in this application may also be referred to as a working path, and is a path configured by a system to transmit service traffic. In this application, an SR-TE tunnel that is configured by the system and that is used as the working channel is referred to as a working SE-TR tunnel. A protection channel described in this application may also be referred to as a protection path, and is a path that is configured by the system and that replaces the working path to transmit the service traffic when the working path cannot transmit the service traffic. In this application, an SR-TE tunnel that is configured by the system and that is used as the protection channel is referred to as a protection SR-TE tunnel.

An APS protocol defines two protection mechanisms: a 1+1 protection switching mechanism and a 1:N protection switching mechanism, where N is a natural number. In the 1+1 protection switching mechanism, a transmit end sends a service on both the working channel and the protection channel, and a receive end selects a communication channel to receive the service. In the 1:N protection switching mechanism, one protection channel provides protection for N working channels. Normally, the transmit end transmits data only on a corresponding working channel, and the protection channel transmits some low-priority data or does not transmit data. When a fault occurs in the working channel, the transmit end bridges to-be-transmitted data to the protection channel, and the receive end receives the data from the protection channel. If the low-priority data is being transmitted on the protection channel, the low-priority data stops being transmitted and high-priority protected data needs to be transmitted on the protection channel. When a fault occurs in several working channels, only data on the working channel with the highest priority can be switched to the protection channel according to priorities of the working channels. Particularly, when N=1, the protection mechanism is a 1:1 protection switching mechanism. The APS in this application may be the 1+1 protection switching mechanism, or may be the 1:N protection switching mechanism. For the APS protocol in this application, refer to any version of ITU-T G.8031/Y.1342.

FIG. 1 is a schematic diagram of a system architecture of a network 100 to which an embodiment of this application is applied. The network 100 comprises a plurality of nodes. As shown in FIG. 1, two SR-TE tunnels: a tunnel 1 and a tunnel 2 are established between a node A and a node Z. For both the node A and the node Z, an SR-TE operation, administration, and maintenance (OAM) detection function is enabled and APS protection is configured. The tunnel 1 is a working SR-TE tunnel, a path of the tunnel 1 is A→B→C→D→E→Z, and a forwarding label stack is {100 101 102 103 104 14}. The tunnel 2 is a protection SR-TE tunnel, a path of the tunnel 2 is A→F→G→H→I→Z, and a forwarding label stack is {105 106 107 108 109 14}. The node A is an Ingress (node (which may also be referred to as a PE node). A node B, a node C, a node D, a node E, a node F, a node G, a node H, and a node I are Transit nodes (which may also be referred to as P nodes or intermediate nodes). The node Z is an Egress node (which may also be referred to as the PE node). A controller calculates a label stack of a path of each SR-TE tunnel, and delivers the label stack to the Ingress node A. A label 14 is a bottommost label, namely, a reserved label, and is used to identify that a packet is an OAM packet. An SR-TE tunnel forwarding procedure is described below by using an example in which the OAM packet is a CCM message.

The node A (Ingress node) sends the CCM message. The CCM message enters the working SR-TE tunnel, namely, the tunnel 1, passes through the tunnel 1, and reaches the node Z (Egress node). A specific forwarding process is as follows:

(a) The node A encapsulates the label stack {100 101 102 103 104 14} in the CCM message, and forwards the CCM message to the node B.

(b) The node B obtains a next hop and an outbound interface through query based on a label 100 in a packet header, pops the label 100, and forwards the CCM message to the node C.

(c) The node C obtains a next hop and an outbound interface through query based on a label 101 in a packet header, pops the label 101, and forwards the CCM message to the node D.

(d) The node D obtains a next hop and an outbound interface through query based on a label 102 in a packet header, pops the label 102, and forwards the CCM message to the node Z.

(e) The node Z identifies, based on the bottommost label 14, that the packet is the OAM packet.

Although an application scenario of this application is described by using FIG. 1 as an example in this application, a person skilled in the art may understand that the technical solutions of this application are applicable to various different network scenarios. This is not specifically limited in this application.

Figure 2:
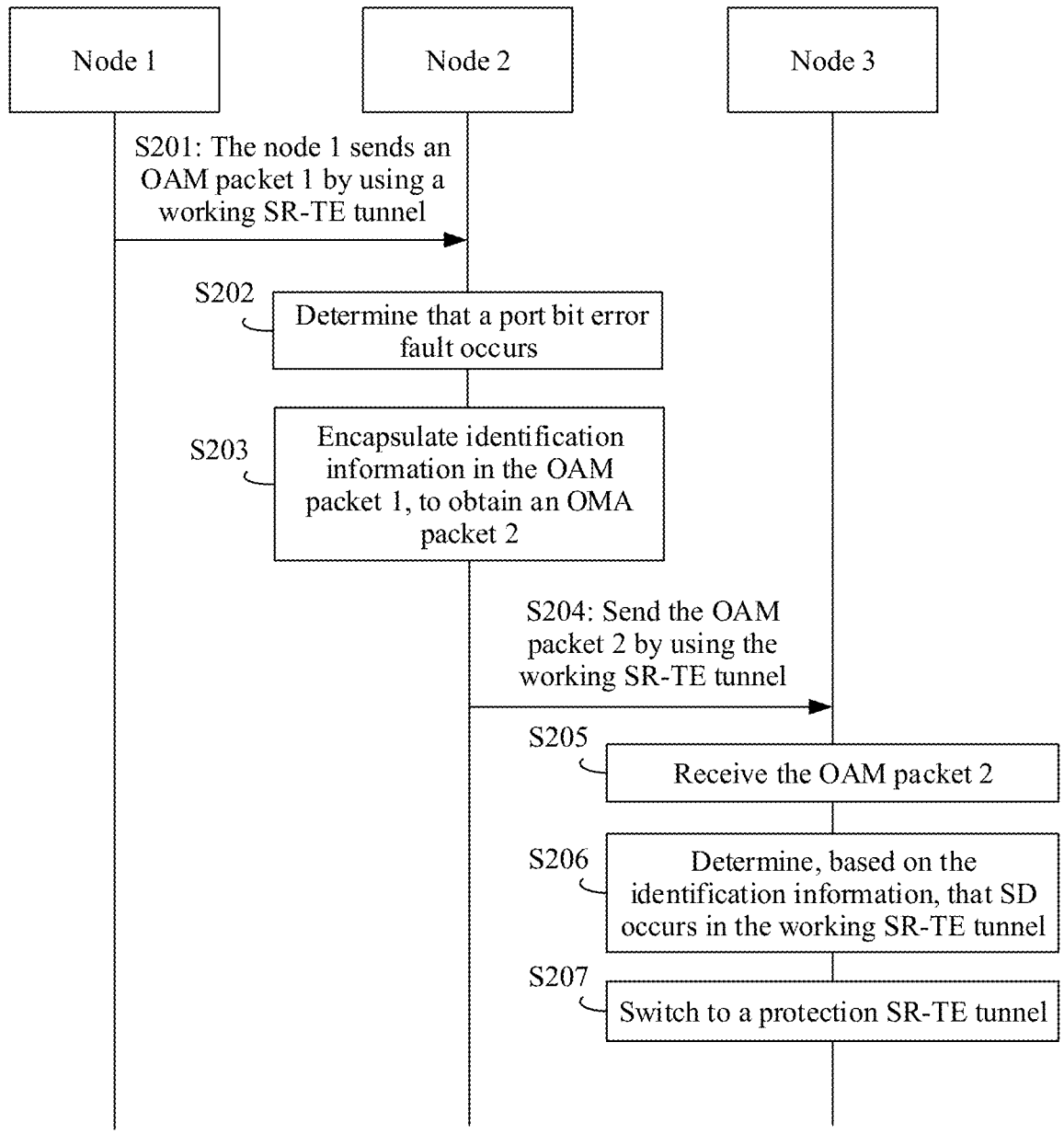
FIG. 2 is a schematic flowchart of a network communication method according to an embodiment of this application.

FIG. 2 is a schematic flowchart of a network communication method 200 according to an embodiment of this application. A network architecture to which the method 200 is applied comprises at least a node 1, a node 2, and a node 3. The node 1 is connected to the node 3 by separately using a working SR-TE tunnel and a protection SR-TE tunnel. The protection SR-TE tunnel is used to provide APS protection for the working SR-TE tunnel when a fault occurs in the working SR-TE tunnel. In a path of the working SR-TE tunnel, the node 1 communicates with the node 3 through the node 2. For example, the node 1 may be the node A in the network architecture shown in FIG. 1, the node 2 may be the node B in the network architecture shown in FIG. 1, the node 3 may be the node Z in the network architecture shown in FIG. 1, the working SR-TE tunnel may be the tunnel 1 shown in FIG. 1, and the protection SR-TE tunnel may be the tunnel 2 shown in FIG. 1. A network to which the method 200 is applied may be the network 100 shown in FIG. 1. The method 200 comprises the following operations.

S201: The node 2 receives, by using the working SR-TE tunnel, an OAM packet 1 sent by the node 1.

The OAM packet 1 may be a CCM message, a linktrace message (LTM), or a delay measurement message (DMM).

S202: The node 2 determines that a port bit error fault occurs on the node 2.

When a node in an SR-TE tunnel determines that a port bit error fault occurs on the node, it is considered that signal degradation SD occurs in the SR-TE tunnel. In this application, a hardware fault (e.g., a hard_bad) is also considered as a port bit error fault. To be specific, if the node 2 determines that a hardware fault occurs on the node 2, the node 2 determines that a port bit error fault occurs on the node 2. For example, the hardware fault may be a forwarding chip damage, a management bus damage, an internal register fault, or a peripheral component interconnect express (PCIe) status fault.

S203: The node 2 encapsulates identification information in the OAM packet 1, to obtain an OAM packet 2.

The identification information is used to identify that signal degradation occurs in the working SR-TE tunnel.

The node 2 may encapsulate the identification information in the OAM packet in, but not limited to, the following manners.

Manner 1:

The OAM packet is a CCM message. A bit error packet is identified by extending, based on an existing CCM message, a flag field of the CCM message by occupying one or more bits in the flag field.

Figure 3A:
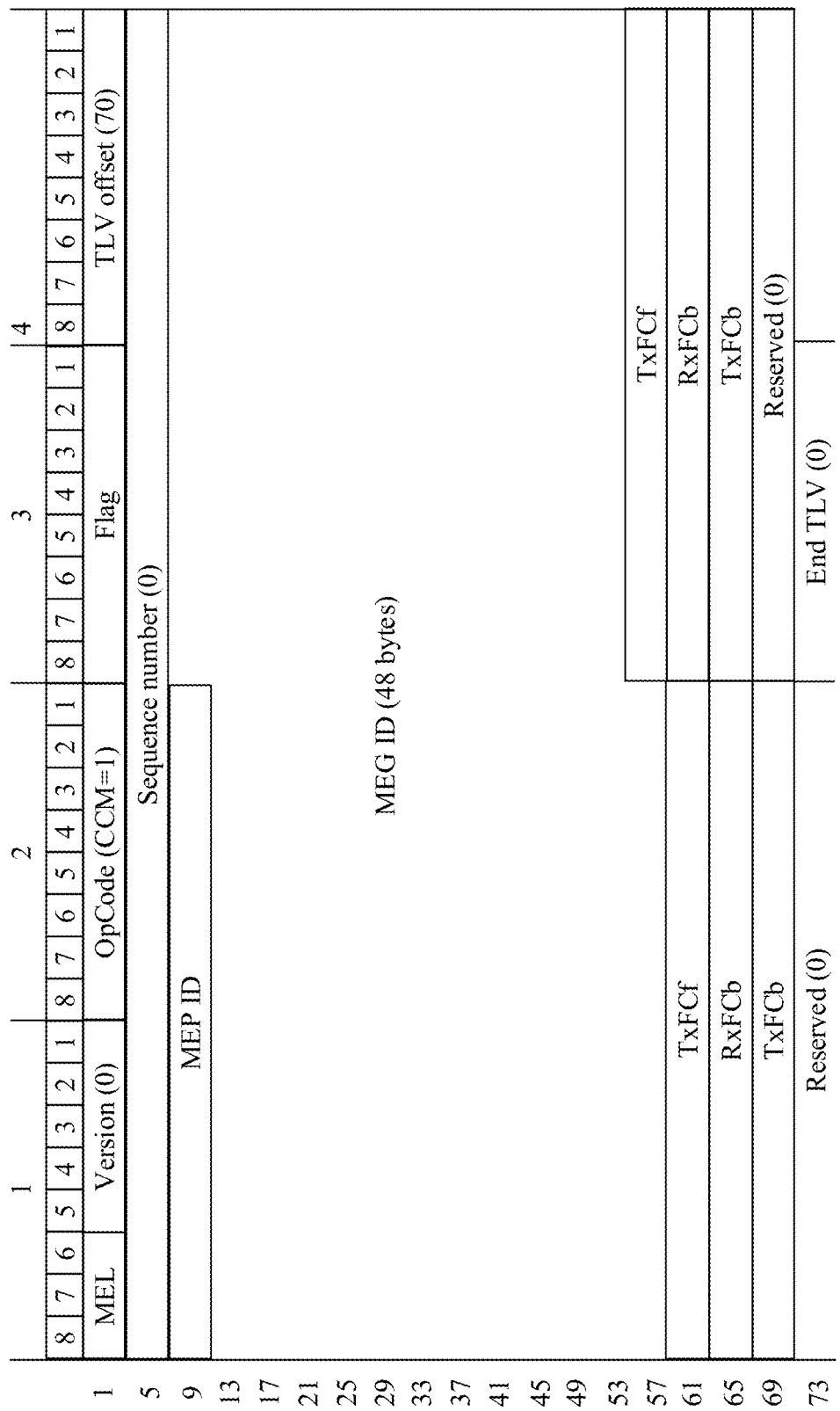
FIG. 3a is a schematic diagram of a format of a CCM protocol data unit (PDU) specified in an existing protocol.

The following further describes Manner 1 with reference to FIG. 3a and FIG. 3b.

FIG. 3a is a schematic diagram of a format of a CCM PDU specified in an existing protocol. For specific descriptions related to fields in the format of the CCM PDU, refer to related descriptions in ITU-T G.8013/Y.1731. Details are not described herein again. The CCM PDU comprises a one-byte flag field. A flag field in the existing CCM message comprises 8 bits, where 1 bit is used as a remote defect indication RDI, 4 bits are used as reserved bits, and 3 bits are used to represent a transmission periodicity.

FIG. 3b is a schematic diagram of a format of a Flag field in an extended CCM PDU. A remote defect indication (RDI) field occupies 1 bit, a periodicity occupies 3 bits, and the identification information used to identify the signal degradation (SD) occupies 1 bit. For example, the SD may be identified by using a bit 7. The other 3 bits are reserved bits. Meanings of the fields are as follows:

RDI: If the RDI is indicated, a bit 8 is set to 1; otherwise, the bit 8 is set to 0.

Period: A bit 3 to a bit 1 indicate a transmission periodicity of the CCM message. For example, the existing protocol specifies that a periodicity value corresponding to 001 is 3.33 ms, namely, 300 frames per second, and a periodicity value corresponding to 010 is 10 ms, namely, 100 frames per second.

Reserved: Reserved indicates a reserved bit. In the existing CCM message, a reserved bit occupies 4 bits. In this application, one of the 4 reserved bits is occupied to identify the SD. For example, the bit 7 is used to identify the SD caused by the port bit error fault.

SD: If a signal degradation fault occurs in a tunnel, the SD field is set to 1; otherwise, the SD field is set to 0.

It should be noted that, in this application, FIG. 3b is merely an example for description. A person skilled in the art may understand that an SD field may occupy the bit 7, or may certainly occupy another bit in a reserved field. The SD may occupy only 1 bit, or may occupy a plurality of bits in the reserved bit.

Manner 2:

The OAM packet is a CCM message. The identification information is carried by extending a Reserved field in the CCM PDU shown in FIG. 3a. In an existing CCM message, the Reserved field occupies 2 bytes, and the identification information may be carried by occupying one or more bits in the Reserved field.

Manner 3:

The OAM packet is a CCM message. The identification information is carried by extending, based on an existing CCM message, an end TLV field in the CCM PDU shown in FIG. 3a. Normally, an end TLV field in an existing CCM protocol message is a value of all-zero bytes. In this application, to indicate a bit error packet, when a bit error occurs, the TLV field may be set to a non-zero value to represent the SD.

Manner 4:

The OAM packet is a linktrace message (LTM). The identification information is carried by extending, based on an existing CCM protocol message, a reserved field in an LTM PDU shown in FIG. 3a by occupying one or more bits in the reserved field.

Manner 5:

When the OAM packet is a delay measurement message (DMM), the identification information is carried by extending, based on an existing DMM message, a flag field in a DMM PDU by occupying one or more reserved bits.

FIG. 3c is a schematic diagram of a format of a Flag field in an extended DMM PDU. In the example of the figure, the identification information may be carried by occupying the bit 8. Certainly, a person skilled in the art may understand that the foregoing example should not constitute a limitation on this application, and the identification information may be carried by occupying one or more other reserved bits.

S204: The node 2 sends, to the node 3 by using the working SR-TE tunnel, the OAM packet 2 carrying the identification information.

After sensing the port bit error fault, the node 2 encapsulates the identification information in the OAM packet 1, continues to forward the OAM packet 1 carrying the identification information to a downstream node, and pops the labels hop-by-hop until the OAM packet 1 is forwarded to the node 3.

S205: The node 3 receives the OAM packet 2 that is sent by the node 2 and that carries the identification information.

S206: The node 3 determines, based on the identification information, that the SD occurs in the working SR-TE tunnel.

S207: The node 3 switches from the working SR-TE tunnel to the protection SR-TE tunnel to communicate with the node 1.

In S205 to S207, after receiving the OAM packet 2, the node 3 identifies a bottommost label 14 and identifies that the packet is the OAM packet. The node 3 parses the OAM packet 2, to obtain the identification information; determines that the SD occurs in the working SR-TE tunnel; and triggers local associated SR-TE APS protection, to be specific, switches a service transmission path from the working SR-TE tunnel to the protection SR-TE tunnel.

After S207, the method 200 may further include the following steps.

The node 3 sends an APS packet to the node 1 by using the protection SR-TE tunnel, to indicate the node 1 to switch from the working SR-TE tunnel to the protection SR-TE tunnel to communicate with the node 3.

The node 1 receives, by using the protection SR-TE tunnel, the APS packet sent by the node 3, and switches to the protection SR-TE tunnel to communicate with the node 3.

After triggering local SR-TE APS switching, the node 3 sends the APS packet to the node 1 by using the protection SR-TE tunnel, to perform APS negotiation; notifies the remote node 1 of a switching status by using the APS packet; and requests the node 1 to perform switching. Specifically, the node 3 first sends the APS packet to the node 2 by using the protection SR-TE tunnel, and the node 2 continues to forward the APS packet to the node 1 after receiving the APS packet.

Figure 4A:
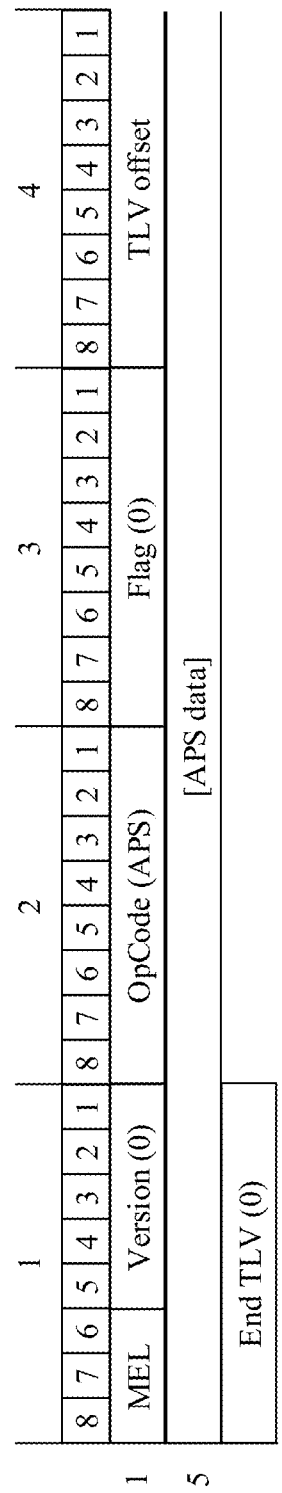
FIG. 4a is a schematic diagram of a format of an APS PDU.

The following describes an APS negotiation procedure and a packet format with reference to FIG. 4a and FIG. 4b.

FIG. 4a is a schematic diagram of a format of an APS PDU. For descriptions of fields in the APS PDU in FIG. 4a, refer to related descriptions in the existing protocol ITU-T G.8013/Y.1731. Details are not described herein again. APS protocol information is carried in an APS data field in FIG. 4a.

A Request/State field is used to identify a request type of the APS packet. For example, in this application, a value of the Request/State field may be 1001, to identify the SD.

A value of a Requested Signal field may be 1, to identify that a protection channel carries a service.

A value of a Bridged Signal field may be 1, to identify that bridging has been performed, that is, to identify that local switching has been performed.

It may be learned from the foregoing description that, according to the method provided in this application, in a network architecture in which the SR-TE tunnel is deployed, after an intermediate node in a path of the SR-TE tunnel senses a bit error fault, extension is performed based on the existing OAM packet, to support a bit error switching function. It is effectively ensured that the SR-TE tunnel supports the intermediate node in bit error switching, and a customer service can be effectively prevented from being damaged. In addition, in the method of this application, interconnection between devices of different vendors is supported. In a scenario in which a device does not support the bit error switching, a received packet is not modified, and a normal function of the SR-TE tunnel is not affected.

Figure 5:
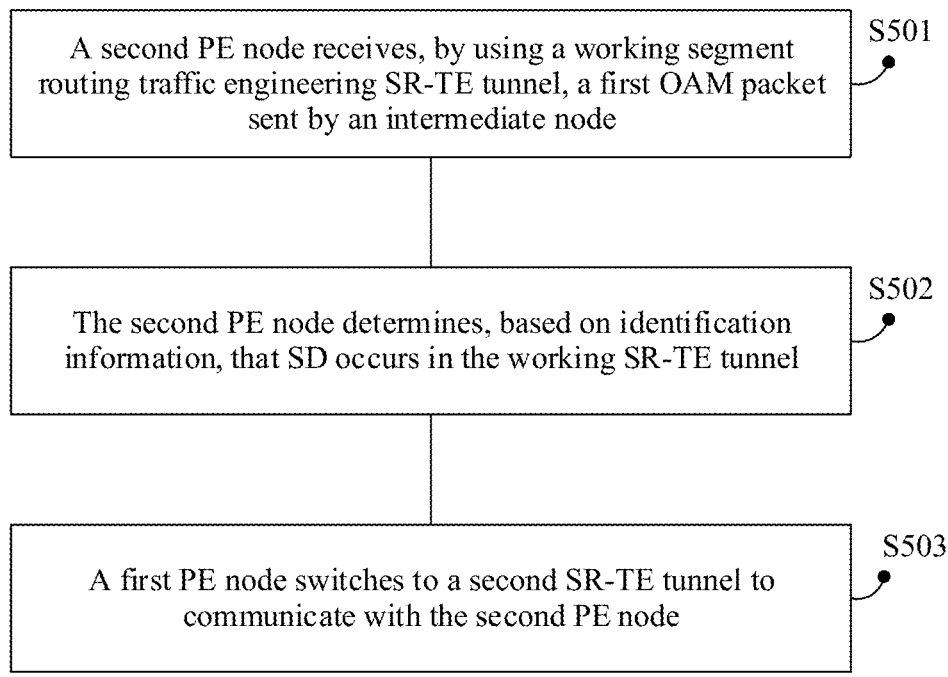
FIG. 5 is a schematic flowchart of another network communication method according to an embodiment of this application.

FIG. 5 is a schematic flowchart of another network communication method 500 according to an embodiment of this application. A network to which the method 500 is applied comprises at least a first PE node, an intermediate node, and a second PE node. The first PE node is connected to the second PE node by separately using a working SR-TE tunnel and a protection SR-TE tunnel. A path of the working SR-TE tunnel comprises the first PE node, the intermediate node, and the second PE node, to be specific, the intermediate node is a node between the first PE node and the second PE node in the path of the working SR-TE tunnel. For example, the first PE node may be the node A in the network architecture shown in FIG. 1, the second PE node may be the node Z in the network architecture shown in FIG. 1, the intermediate node may be the node B in the network architecture shown in FIG. 1, the working SR-TE tunnel may be the tunnel 1 shown in FIG. 1, and the protection SR-TE tunnel may be the tunnel 2 shown in FIG. 1. A network architecture to which the method 500 is applied may be the network architecture 100 shown in FIG. 1. The method 500 comprises the following operations.

S501: The second PE node receives, by using the working segment routing traffic engineering SR-TE tunnel, a first operation, administration, and maintenance OAM packet sent by the intermediate node.

The first OAM packet carries identification information, and the identification information is used to identify that signal degradation SD occurs in the working SR-TE tunnel.

The identification information is encapsulated in the first OAM packet by the intermediate node after the intermediate node determines that a port bit error fault occurs on the intermediate node. Specifically, the intermediate node determines that the port bit error fault occurs; receives a second OAM packet sent by the first PE node; encapsulates the identification information in the second OAM packet, to obtain the first OAM packet; and sends the first OAM packet to the second PE node.

The first OAM packet may be a continuity check message CCM. In a specific implementation, the CCM message comprises a Flag field, and the Flag field carries the identification information. In another specific implementation, the CCM message comprises a Reserved field, and the Reserved field carries the identification information.

The first OAM packet may alternatively be an LTM message. In a specific implementation, the LTM message comprises a reserved field used to carry the identification information.

The first OAM packet may alternatively be a delay measurement message DMM. In a specific implementation, the DMM message comprises a flag field, and the Flag field carries the identification information. In another specific implementation, the DMM message comprises a reserved field, and the Reserved field carries the identification information.

For a specific manner in which the first OAM packet carries the identification information, refer to related descriptions of S203 in the method 200. Details are not described herein again.

S502: The second PE node determines, based on the identification information, that the SD occurs in the working SR-TE tunnel.

S503: The second PE node switches to the protection SR-TE tunnel to communicate with the second PE node.

In a specific implementation, after S503, the method 500 further comprises:

sending, by the first PE node, an automatic protection switching APS packet to the second PE node by using the protection SR-TE tunnel, where the APS packet is used to instruct the second PE node to switch from the working SR-TE tunnel to the protection SR-TE tunnel to communicate with the first PE node.

In the foregoing method provided in this application, after receiving the OAM packet sent by the first PE node, the second PE node parses the OAM packet, to obtain the identification information, and may determine, based on the identification information, whether the signal degradation occurs in the working SR-TE tunnel. Compared with the prior approaches, APS switching of an end-to-end SR-TE tunnel can be specified more accurately. Specifically, in the prior approaches, for the end-to-end SR-TE tunnel, when the port bit error fault occurs on the intermediate node (for example, the node B) in the working SR-TE tunnel, packet data that passes through a port of the node B is randomly modified due to the port bit error fault. If the OAM packet is just not modified when passing through the port of the node B, that is, data in the OMA packet is not modified, after receiving the packet, the node Z parses the packet, and determines, according to a field matching rule, that a normal OAM packet is received. Therefore, the node Z does not trigger APS protection, and continues to communicate with the node A by using working SR-TE tunnel. The OAM packet usually has a relatively long transmission periodicity. For example, the periodicity is 3.3 ms. During the transmission periodicity, the node B receives another service packet, and a normal customer service packet may be modified due to the port bit error fault. However, the node Z previously receives the normal OAM packet, and considers that no fault occurs in the working SR-TE tunnel. Therefore, the node Z does not trigger the APS protection, and continues to communicate with the node A on the working SR-TE tunnel. However, in this case, the customer service has been damaged due to the port bit error fault of the intermediate node on the link. During a next transmission periodicity, the node Z triggers the APS protection only when the node Z cannot receive the OAM packet. Otherwise, the node Z continues to communicate with the node A by using the tunnel 1. Consequently, the customer service may be continuously damaged. In other words, in the prior approaches, when the port bit error fault of the intermediate node results in signal degradation of a current transmission path, the packet can only be randomly modified due to the port bit error fault. Consequently, a sink node may normally receive the OAM packet, and cannot correctly trigger APS switching. However, according to the method in this application, after determining that the port bit error fault occurs, the intermediate node adds, to the OAM packet, identification information that identifies that the signal degradation occurs in the current transmission path. Therefore, after receiving the OAM packet, although the sink node parses the packet through normal field matching and fails to find that the signal degradation occurs in the current transmission path, the sink node can still identify, by using the identification information carried in the packet, that the SD occurs in the current transmission path, so that the APS switching of the end-to-end SR-TE tunnel can be specified more accurately.

Figure 6:
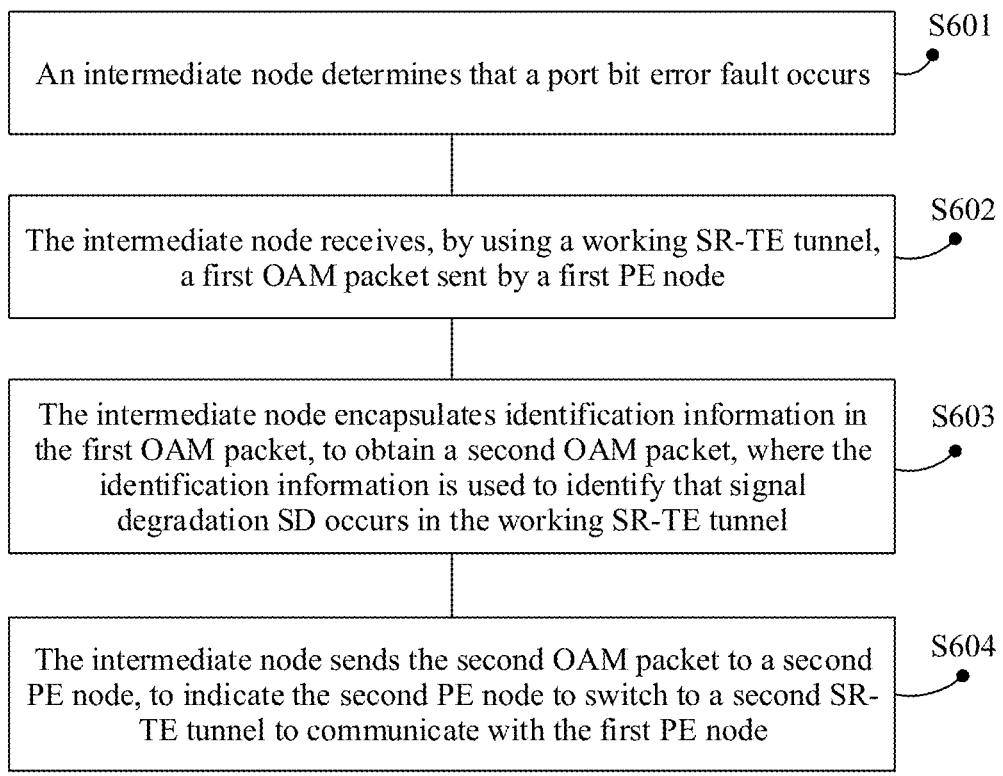
FIG. 6 is a schematic flowchart of another network communication method according to an embodiment of this application.

FIG. 6 is a schematic flowchart of another network communication method 600 according to an embodiment of this application. A network to which the method 600 is applied comprises at least a first PE node, an intermediate node, and a second PE node. The first PE node is connected to the second PE node by separately using a working SR-TE tunnel and a protection SR-TE tunnel. For example, the first PE node may be the node A in the network architecture shown in FIG. 1, the second PE node may be the node Z in the network architecture shown in FIG. 1, the intermediate node may be the node B in the network architecture shown in FIG. 1, the working SR-TE tunnel may be the tunnel 1 shown in FIG. 1, and the protection SR-TE tunnel may be the tunnel 2 shown in FIG. 1. A network architecture to which the method 600 is applied may be the network architecture 100 shown in FIG. 1. The method 600 comprises the following operations.

S601: The intermediate node determines that a port bit error fault occurs.

Specifically, the intermediate node is a node between the first PE node and the second PE node in a path of the working SR-TE tunnel. When an intermediate node in an SR-TE tunnel determines that a port bit error fault occurs on the intermediate node, it is considered that signal degradation SD occurs in the SR-TE tunnel. In this application, a hardware fault (e.g., hard_bad) is also considered as a port bit error fault. To be specific, if the intermediate node determines that a hardware fault occurs on the intermediate node, the intermediate node determines that a port bit error fault occurs on intermediate node. For example, the hardware fault may be a forwarding chip damage, a management bus damage, an internal register fault, or a peripheral component interconnect express (PCIe) status fault.

S602: The intermediate node receives, by using the working SR-TE tunnel, a first OAM packet sent by the first PE node.

S603: The intermediate node encapsulates identification information in the first OAM packet, to obtain a second OAM packet, where the identification information is used to identify that signal degradation SD occurs in the first SR-TE tunnel.

The first OAM packet and the second OAM packet may be continuity check messages CCM. In a specific implementation, the CCM message comprises a flag Flag field, and the Flag field is used to carry the identification information. In another specific implementation, the CCM message comprises a Reserved field, and the Reserved field is used to carry the identification information.

The first OAM packet and the second OAM packet may alternatively be LTM messages. In a specific implementation, the LTM message comprises a reserved field used to carry the identification information.

The first OAM packet and the second OAM packet may alternatively be delay measurement messages DMM. In a specific implementation, the DMM message comprises a flag field, and the Flag field comprises the identification information. In another specific implementation, the DMM message comprises a Reserved field, and the Reserved field is used to carry the identification information.

For a specific manner in which the second OAM packet carries the identification information, refer to related descriptions of S203 in the method 200. Details are not described herein again.

S604: The intermediate node sends the second OAM packet including the identification information to the second PE node, where the second OAM packet is used to instruct the second PE node to switch to the protection SR-TE tunnel to communicate with the first PE node.

It may be learned from the foregoing description that, according to the method provided in this application, in a network architecture in which the SR-TE tunnel is deployed, after the intermediate node in the path of the SR-TE tunnel senses a bit error fault, extension is performed based on the existing OAM packet, to support a bit error switching function. The intermediate node encapsulates, in the received OAM packet, identification information that identifies link degradation, and sends, to a PE node at a sink end, the packet in which the identification information is encapsulated, so that when receiving the OAM packet, the PE node at the sink end can learn, based on the identification information carried in the packet, that signal degradation occurs in a current SR-TE tunnel. According to the method of this application, it is effectively ensured that the SR-TE tunnel supports the intermediate node in bit error switching, and a customer service can be effectively prevented from being damaged. In addition, in the method of this application, interconnection between devices of different vendors is supported. Even if in a scenario in which a device does not support the bit error switching, a received packet is not modified, and a normal function of the SR-TE tunnel is not affected.

The above describes the communication method according to the embodiments of this application with reference to FIG. 2 to FIG. 6. The following describes a communications apparatus corresponding to the foregoing method embodiments with reference to FIG. 7 and FIG. 8.

Figure 7:
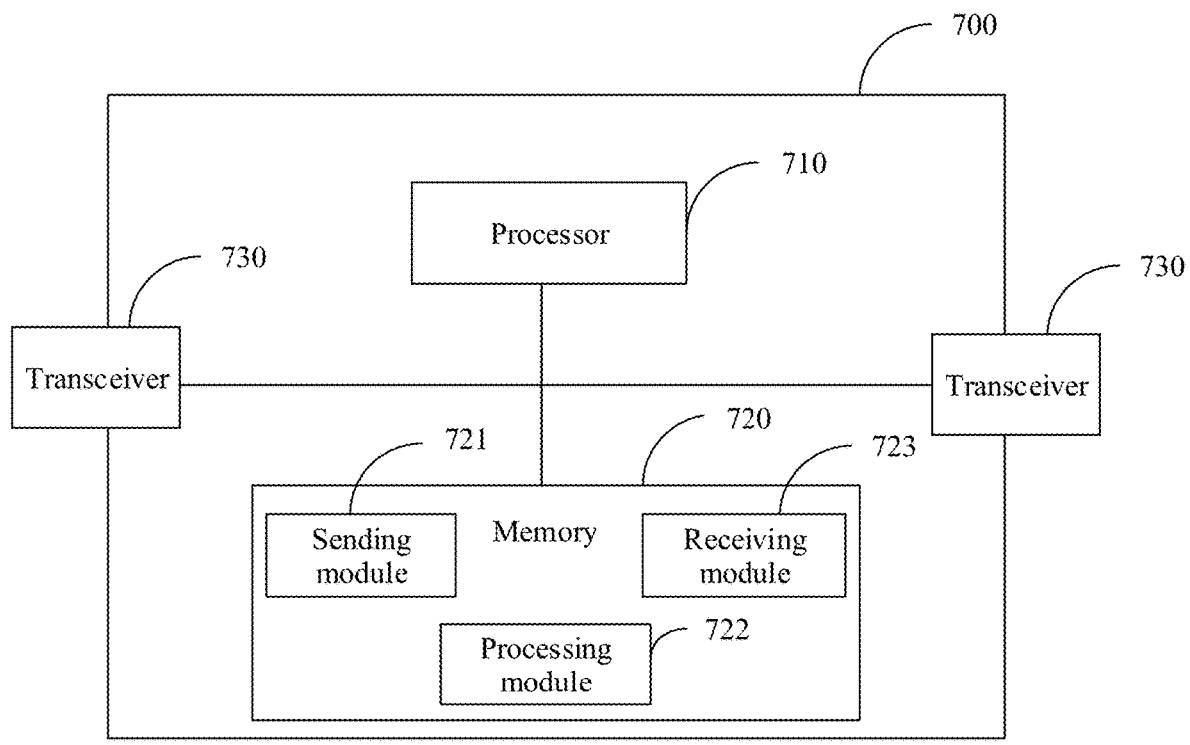
FIG. 7 is a schematic diagram of a network communications apparatus according to an embodiment of this application.

FIG. 7 is a schematic diagram of a communications apparatus 700 according to an embodiment of this application. The communications apparatus 700 may be applied to the network architecture shown in FIG. 1, for example, may be applied to the node B in the network architecture shown in FIG. 1. As shown in FIG. 7, the communications apparatus 700 may include a processor 710, a memory 720 coupled to the processor 710, and a transceiver 730. The processor 710 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof. The processor 710 may be one processor, or may include a plurality of processors. The memory 720 may include a volatile memory, for example, a random access memory (RAM). The memory may alternatively include a non-volatile memory, for example, a read-only memory (ROM), a flash memory, a hard disk drive (HDD), or a solid-state drive (SSD). The memory may alternatively include a combination of the foregoing memories. The memory 720 may be one memory, or may include a plurality of memories. The memory 720 stores a computer-readable instruction, and the computer-readable instruction may include a plurality of software modules, for example, a sending module 721, a processing module 722, and a receiving module 723. After executing each software module, the processor 710 may perform a corresponding operation based on an instruction of the software module. In this embodiment, an operation performed by a software module is actually an operation performed by the processor 710 based on an instruction of the software module. In some implementations, when a module is configured to perform an operation, it may actually indicate that the processor 710 is configured to execute an instruction in the module to complete the operation. The receiving module 723 is configured to receive, by using a working SR-TE tunnel, a first operation, administration, and maintenance OAM packet sent by a first PE node. An Internet Protocol (IP) address of the first OAM packet is an IP address of the first PE node, and a destination IP address of the first OAM packet is an IP address of a second PE node. The processing module 722 is configured to: determine that a port bit error fault occurs on an intermediate node, and encapsulate identification information in the first OAM packet, to obtain a second OAM packet, where the identification information is used to identify that signal degradation SD occurs in the working SR-TE tunnel. The sending module 721 is configured to send the second OAM packet to the second PE node by using the working SR-TE tunnel, where the second OAM packet is used to instruct the second PE node to switch to a protection SR-TE tunnel to communicate with the first PE node. In addition, after executing the computer-readable instruction in the memory 720, the processor 710 may perform, based on an instruction of the computer-readable instruction, some or all operations performed by the intermediate node in the method 200, the method 500, or the method 600.

Figure 8:
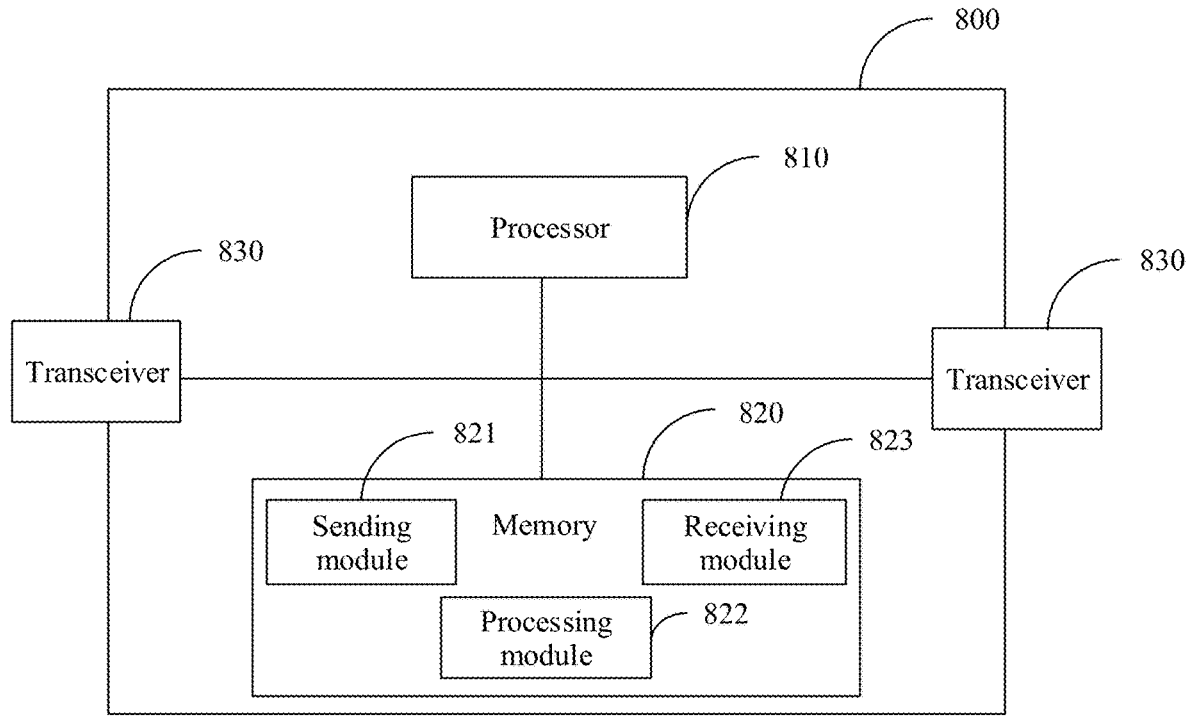
FIG. 8 is a schematic diagram of a network communications apparatus according to an embodiment of this application.

FIG. 8 is a schematic diagram of a communications apparatus 800 according to an embodiment of this application.

The communications apparatus 800 may be applied to the network architecture shown in FIG. 1, for example, may be applied to the node Z in the network architecture shown in FIG. 1. As shown in FIG. 8, the communications apparatus 800 may include a processor 810, a memory 820 coupled to the processor 810, and a transceiver 830. The processor 810 may be a central processing unit (CPU), a network processor (NP), or a combination of a CPU and an NP. The processor may further include a hardware chip. The hardware chip may be an application-specific integrated circuit (EASIC), a programmable logic device (EPLD), or a combination thereof. The PLD may be a complex programmable logic device (CPLD), a field-programmable logic gate array (EFPGA), a generic array logic (GAL), or any combination thereof. The processor 710 may be one processor, or may include a plurality of processors. The memory 820 may include a volatile memory, for example, a random access memory (RAM). The memory may alternatively include a non-volatile memory, for example, a read-only memory (ROM), a flash memory, a hard disk drive (HDD), or a solid-state drive (SSD). The memory may alternatively include a combination of the foregoing memories. The memory 820 may be one memory, or may include a plurality of memories. The memory 820 stores a computer-readable instruction, and the computer-readable instruction may include a plurality of software modules, for example, a sending module 821, a processing module 822, and a receiving module 823. After executing each software module, the processor 810 may perform a corresponding operation based on an instruction of the software module. In this embodiment, an operation performed by a software module is actually an operation performed by the processor 810 based on an instruction of the software module. In some implementations, when a module is configured to perform an operation, it may actually indicate that the processor 810 is configured to execute an instruction in the module to complete the operation. The receiving module 823 is configured to receive, by using a working SR-TE tunnel, a first operation, administration, and maintenance OAM packet sent by an intermediate node. A source Internet Protocol IP address of the first OAM packet is an IP address of the first PE node, and a destination IP address of the first OAM packet is an IP address of a second PE node. The first OAM packet carries identification information, and the identification information is used to identify that signal degradation SD occurs in the working SR-TE tunnel. The processing module 822 is configured to: determine, based on the identification information, that the SD occurs in the working SR-TE tunnel, and switch to a protection SR-TE tunnel to communicate with the first PE node. The sending module 721 is configured to send an automatic protection switching APS packet to the first PE node by using the protection SR-TE tunnel after the second PE node switches to the protection SR-TE tunnel, where the APS packet is used to instruct the first PE node to switch to the protection SR-TE tunnel to communicate with the second PE node. In addition, after executing the computer-readable instruction in the memory 720, the processor 710 may perform, based on an instruction of the computer-readable instruction, some or all operations performed by the second PE node in the method 200, the method 500, or the method 600.

This application further provides a communications system. The communications system may be applied to the network architecture shown in FIG. 1. The communications system comprises a first provider edge PE node, an intermediate node, and a second PE node. The first PE node is connected to the second PE node by separately using a working segment routing traffic engineering SR-TE tunnel and a protection SR-TE tunnel. A path of the working SR-TE tunnel comprises the first PE node, the intermediate node, and the second PE node. For example, in the communications system, the intermediate node may be the intermediate node provided in the embodiment corresponding to FIG. 7, and the second PE node may be the second PE node provided in the embodiment corresponding to FIG. 8. The communications system is configured to perform the method in any embodiment corresponding to FIG. 1 or FIG. 6.

It should be understood that, in the embodiments of this application, sequence numbers of the processes do not mean execution sequences. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing apparatus and system, refer to a corresponding process in the foregoing method embodiments. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product comprises one or more computer instructions. When the computer program instructions are loaded and executed on a computer, all or some of procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The embodiments in this specification are all described in a progressive manner, for same or similar parts of the implementations, refer to these embodiments, and each implementation focuses on a difference from other implementations. Especially, apparatus and system embodiments are basically similar to a method embodiment, and therefore are described briefly. For related parts, refer to the descriptions in the method embodiment.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An intermediate node, comprising:
a memory comprising instructions; and
a processor coupled with the memory, the instructions when executed by the processor cause the intermediate node to:
receive, using a segment routing traffic engineering (SR-TE) working tunnel, a first operation, administration and maintenance (OAM) packet from a first provider edge (PE) node;
encapsulate identification information in the first OAM packet to obtain a second OAM packet, wherein the identification information identifies that signal degradation (SD) occurs in the working SR-TE tunnel, wherein the second OAM packet is a continuity check message (CCM), wherein the intermediate node is between the first PE node and a second PE node on the working SR-TE tunnel, and the first PE node is an ingress node of the working SR-TE tunnel, the second PE node is an egress node of the working SR-TE tunnel; and
send the second OAM packet to the second PE node using the working SR-TE tunnel.

2. The intermediate node according to claim 1, wherein the identification information is carried in a flag field in the CCM.

3. The intermediate node according to claim 1, wherein the identification information is carried in a reserved field in the CCM.

4. The intermediate node according to claim 1, wherein the instructions when executed by the processor further cause the intermediate node to:
before obtaining the second OAM packet, determine that a port bit error fault occurs on the intermediate node.

5. A communications system, comprising:
a first provider edge (PE) node;
an intermediate node; and
a second PE node, wherein the first PE node is connected to the second PE node by using a working segment routing traffic engineering (SR-TE) tunnel, and a path of the working SR-TE tunnel comprises the first PE node, the intermediate node, and the second PE node, wherein
the first PE node is configured to:
  send a first operation, administration, and maintenance OAM packet (OAM) packet using the working SR-TE tunnel;
the intermediate node is configured to:
  receive, using the working SR-TE tunnel, the first OAM packet sent by the first PE node,
encapsulate identification information in the first OAM packet to obtain a second OAM packet, wherein the identification information identifies that signal degradation (SD) occurs in the working SR-TE tunnel, wherein the second OAM packet is a continuity check message (CCM); and
the second PE node is configured to:
  receive, using the working SR-TE tunnel, the second OAM packet,
  determine, based on the identification information, that the SD occurs in the working SR-TE tunnel.

6. The system according to claim 5, wherein the identification information is carried in a flag field in the CCM.

7. The system according to claim 5, wherein the identification information is carried in a reserved field in the CCM.

8. The system according to claim 5, wherein the second PE node is connected to first PE node by using a protection SR-TE tunnel, the second PE node is further configure to:
  on determining the SD occurs in the working SR-TE tunnel, switch from the working SR-TE tunnel to the protection SR-TE tunnel.

9. The system according to claim 8, wherein the second PE is further configured to:
  send, by using the protection SR-TE tunnel, an automatic protection switching (APS) packet to the first PE node after the second PE node switching to the protection SR-TE tunnel, wherein the APS packet instructs the first PE node to switch to the protection SR-TE tunnel.

10. The system according to claim 9, wherein the first PE node is further configured to:
  switch from the working SR-TE tunnel to the protection SR-TE tunnel.

11. A communication method, implemented by an intermediate node, comprising:
  receiving, using a segment routing traffic engineering (SR-TE) working tunnel, a first operation, administration and maintenance (OAM) packet from a first provider edge (PE) node;
  encapsulating identification information in the first OAM packet to obtain a second OAM packet, wherein the identification information identifies that signal degradation (SD) occurs in the working SR-TE tunnel, wherein the second OAM packet is a continuity check message (CCM), wherein the intermediate node is between the first PE node and a second PE node on the working SR-TE tunnel, and the first PE node is an ingress node of the working SR-TE tunnel, the second PE node is an egress node of the working SR-TE tunnel; and
  sending the second OAM packet to the second PE node using the working SR-TE tunnel.

12. The method according to claim 11, wherein the identification information is carried in a flag field in the CCM.

13. The method according to claim 11, the identification information is carried in a reserved field in the CCM.

14. The method according to claim 11, wherein the method further comprises:
  before obtaining the second OAM packet, determining that a port bit error fault occurs on the intermediate node.

* * * * *